(12) United States Patent
Hiranuma et al.

(10) Patent No.: US 10,353,540 B2
(45) Date of Patent: Jul. 16, 2019

(54) DISPLAY CONTROL DEVICE

(71) Applicant: KYOCERA Document Solutions Inc., Osaka-shi, Osaka (JP)

(72) Inventors: Yoichi Hiranuma, Osaka (JP); Hiroki Takehana, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/515,605

(22) PCT Filed: Dec. 7, 2016

(86) PCT No.: PCT/JP2016/086315
§ 371 (c)(1),
(2) Date: Mar. 30, 2017

(87) PCT Pub. No.: WO2017/168850
PCT Pub. Date: Oct. 5, 2017

(65) Prior Publication Data
US 2019/0012061 A1    Jan. 10, 2019

(30) Foreign Application Priority Data
Mar. 30, 2016 (JP) ................................ 2016-067227

(51) Int. Cl.
*G06F 3/0481* (2013.01)
*G06F 3/0488* (2013.01)
*G09G 5/00* (2006.01)
*G09G 5/377* (2006.01)
(Continued)

(52) U.S. Cl.
CPC ........ *G06F 3/04817* (2013.01); *G06F 3/0481* (2013.01); *G06F 3/0486* (2013.01); *G06F 3/0488* (2013.01); *G06F 3/04842* (2013.01); *G09G 5/00* (2013.01); *G09G 5/377* (2013.01)

(58) Field of Classification Search
CPC .................................................. G06F 3/04817
See application file for complete search history.

(56) References Cited

U.S. PATENT DOCUMENTS

2005/0177796 A1* 8/2005 Takahashi ................. G06F 3/00
2008/0307364 A1* 12/2008 Chaudhri et al. ........ G06F 3/048
2010/0299635 A1* 11/2010 Oh et al. ................. G06F 3/048
(Continued)

FOREIGN PATENT DOCUMENTS

JP    2013525878 A    6/2013
WO    2011126501 A1   10/2011

*Primary Examiner* — James J Debrow
(74) *Attorney, Agent, or Firm* — Viering, Jentschura & Partner MBB

(57) ABSTRACT

The display control device includes a display control unit, a selection detecting unit, an icon identifying unit, and an aggregate-icon creating unit. The selection detecting unit detects whether a plurality of icons displayed on a display screen have been selected as if the icons were connected along a line. When the selection detecting unit detects that the icons have been selected as if the icons were connected along a line, the icon identifying unit identifies the selected icons along the line. The aggregate-icon creating unit creates an aggregate icon aggregating the icons identified by the icon identifying unit. The display control unit performs control operations to display the aggregate icon created by the aggregate-icon creating unit on the display screen.

12 Claims, 6 Drawing Sheets

(51) Int. Cl.
*G06F 3/0484* (2013.01)
*G06F 3/0486* (2013.01)

(56) References Cited

U.S. PATENT DOCUMENTS

| | | | |
|---|---|---|---|
| 2013/0167090 A1* | 6/2013 | Tomizu | G06F 3/0482 |
| 2013/0174069 A1* | 7/2013 | Lee | G06F 3/0486 |
| 2014/0317555 A1* | 10/2014 | Choi et al. | G06F 3/0481 |
| 2015/0121263 A1* | 4/2015 | Yeh | G06F 3/04817 |
| 2015/0177931 A1* | 6/2015 | Ho et al. | G06F 3/0482 |
| 2017/0322708 A1* | 11/2017 | Huang et al. | G06F 3/0484 |

* cited by examiner

DISPLAY CONTROL DEVICE

RELATED APPLICATIONS

The present application is a national stage entry according to 35 U.S.C. § 371 of PCT application No.: PCT/JP2016/086315 filed on Dec. 7, 2016, which claims priority from Japanese application No.: 2016-067227 filed on Mar. 30, 2016 and is incorporated herein by reference in its entirety.

TECHNICAL FIELD

The present invention relates to a display control device.

BACKGROUND ART

Mobile terminal apparatuses, such as smartphones, have a display screen on which icons are displayed. The icons allow users to launch applications, or to open files or folders, with a tap. Tapping an icon opens a window to show the launched application or the contents of the opened file or folder.

In general, a plurality of icons are displayed on the display screen to improve user convenience. Japanese Translation of PCT International Application Publication No. 2013-525878 (PTL 1) discloses a technique of grouping icons on a display screen in one place. According to PTL 1, two icons are put together in one place by touching and moving an icon to the other icon.

CITATION LIST

Patent Literature

PTL 1: Japanese Translation of PCT International Application Publication No. 2013-525878

SUMMARY OF INVENTION

Technical Problem

The technique of grouping a plurality of icons as disclosed in PTL 1 requires the user to touch and drag the icons one by one. Grouping a small number of icons may not take a large effort, but the user's operation complexity increases with an increase in the number of icons to be grouped. Therefore, improvement of user convenience in aggregating a large number of icons is required.

The object of this invention is to provide a display control device that can improve user convenience.

Solution to Problem

The display control device according to this invention displays icons on a display unit. The display control device includes a display control unit, a selection detecting unit, an icon identifying unit, and an aggregate-icon creating unit. The display control unit performs control operations to display the icons on the display unit. The selection detecting unit detects whether a plurality of icons displayed on the display unit have been selected as if the icons were connected along a line. When the selection detecting unit detects that the icons have been selected as if the icons were connected along a line, the icon identifying unit identifies the selected icons along the line. The aggregate-icon creating unit creates an aggregate icon aggregating the icons identified by the icon identifying unit. The display control unit performs control operations to display the aggregate icon created by the aggregate-icon creating unit on the display unit.

Advantageous Effects of Invention

According to the display control device, upon detecting that a plurality of icons have been selected as if the icons were connected along a line for the purpose of aggregating the icons in an icon, the display control device identifies the selected icons located along the line, and creates an aggregate icon. This display control device eliminates the need of manipulating the icons one by one to aggregate the large number of icons. Thus, the display control device can improve user convenience.

DESCRIPTION OF EMBODIMENT

Figure 1:
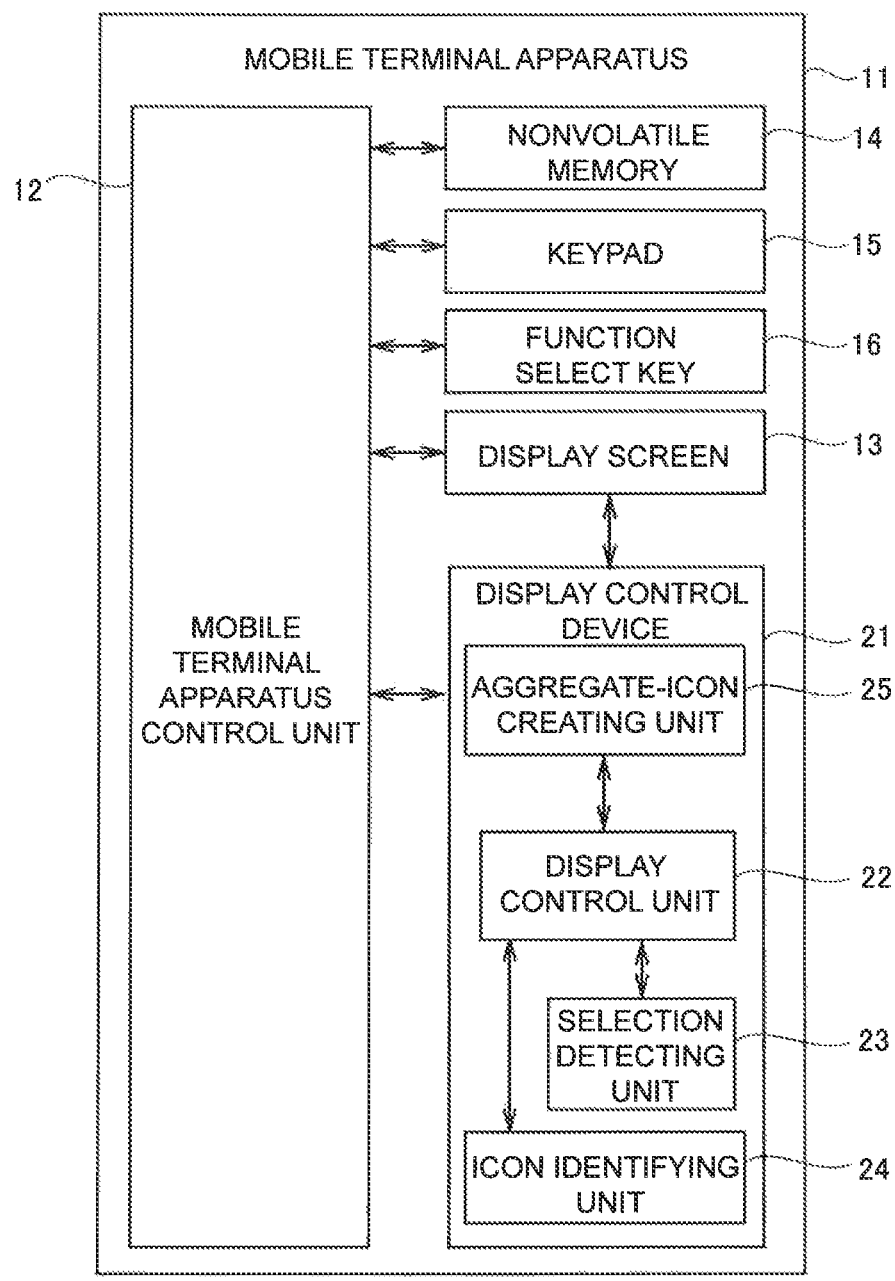
FIG. 1 is a block diagram showing the configuration of a mobile terminal apparatus including a display control device according to an embodiment of the invention.
Figure 2:
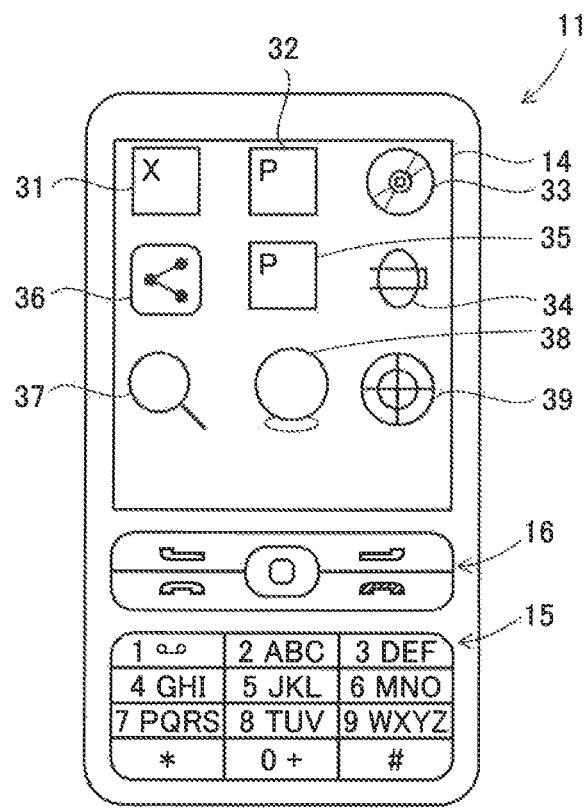
FIG. 2 is an external view of the mobile terminal apparatus shown in FIG. 1.

An embodiment of the present invention will be described below. FIG. 1 is a block diagram showing the configuration of a mobile terminal apparatus including a display control device according to the embodiment of the invention. FIG. 2 is an external view of the mobile terminal apparatus shown in FIG. 1.

Referring to FIGS. 1 and 2, a mobile terminal apparatus 11 includes a mobile terminal apparatus control unit 12, a display screen 13, which serves as a display unit, a nonvolatile memory 14, a keypad 15, a function select key 16, and a display control device 21. The mobile terminal apparatus 11 is configured to communicate with external electronic devices. Specifically, the mobile terminal apparatus 11 can be connected to a communication-capable printer or multifunctional printer (MFP) (neither shown), and can transmit image data and make a print request to print out a file from the printer or MFP. In addition, the mobile terminal apparatus 11 can transmit data in a file to a hard disk built in the MFP or other communication-capable devices, to store the file, which is so-called box storage.

The mobile terminal apparatus control unit 12 controls the mobile terminal apparatus 11. The nonvolatile memory 14 stores various types of data. Various applications are also installed in the nonvolatile memory 14. The user can input numbers from 0 to 9, alphabet letters from A to Z, and other symbols and signs by pressing the keypad 15. The user also can perform various operations by pressing predetermined parts of the function select key 16. For example, the user selects the call function of the mobile terminal apparatus 11 and presses the function select key 16 to start a call and disconnect the call.

The display screen 13 functions as an output interface for the user when the mobile terminal apparatus 11 displays information on the display screen 13. Specifically, the display screen 13 displays various kinds of information related to the mobile terminal apparatus 11 as well as descriptions input by the user.

In addition, the display screen 13 is a touch panel type screen and functions as an input interface from the user to the mobile terminal apparatus 11. Specifically, the user views the descriptions displayed on the display screen 13, manipulates the screen, for example taps an icon, with his/her fingers, to input instructions to be executed to the mobile terminal apparatus 11.

The display control device 21 includes a display control unit 22. The display control unit 22 displays on the display screen 13 nine icons 31, 32, 33, 34, 35, 36, 37, 38, 39 each representing a file or an application stored in the mobile terminal apparatus 11. The file denotes an electronic file. The icons 31 to 39 are arranged with predetermined spacing. Tapping the icons 31 to 39 can launch the applications associated with the respective files.

The display control device 21 includes a selection detecting unit 23, an icon identifying unit 24, and an aggregate-icon creating unit 25. The selection detecting unit 23 detects whether the icons 31 to 39 displayed on the display screen 13 have been selected as if the icons were connected. The selection is made, for example, by the user touching the icons 31 to 39 displayed on the display screen 13 as if to connect them. When the selection detecting unit 23 detects that the icons 31 to 39 have been selected as if the icons were connected along a line, the icon identifying unit 24 identifies the selected icons 31 to 39 located along the line. The aggregate-icon creating unit 25 creates an aggregate icon aggregating the icons 31 to 39 identified by the icon identifying unit 24. The display control unit 22 performs control operations so as to display the aggregate icon created by the aggregate-icon creating unit 25 on the display screen 13.

Figure 3:
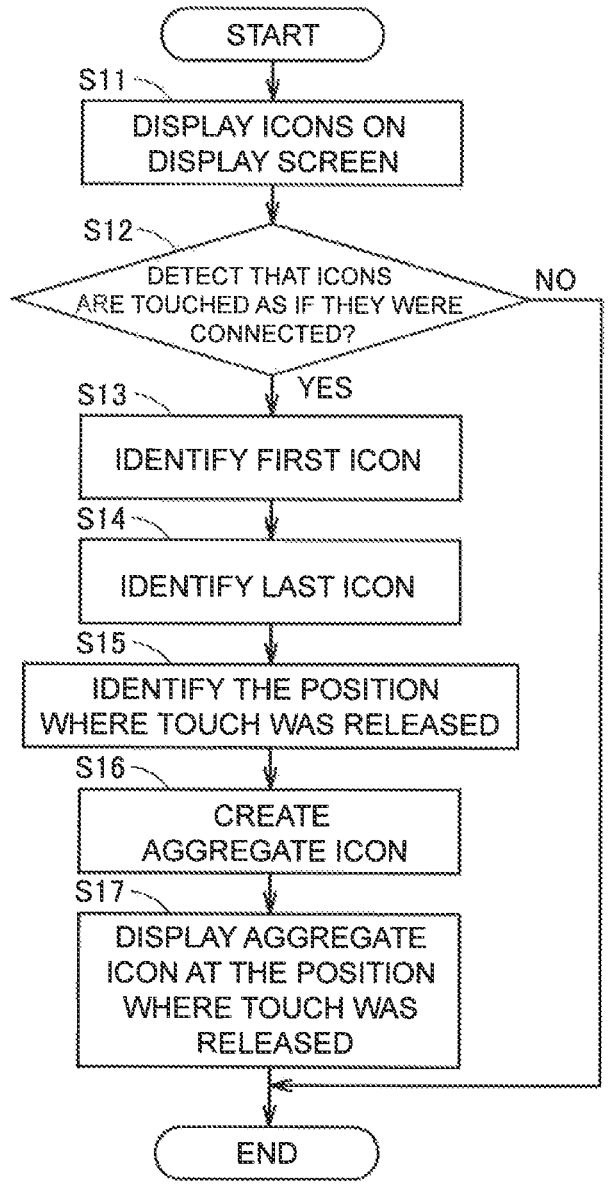
FIG. 3 is a flow chart for describing the main steps performed by the display control device.

Next, a description will be made about how to aggregate icons using the mobile terminal apparatus 11 including the display control device 21. FIG. 3 is a flow chart for describing the main steps performed by the display control device 21. Referring to FIG. 3, upon start-up of the mobile terminal apparatus 11, the display control unit 22 of the display control device 21 displays nine icons 31 to 39 on the display screen 13 (step S11 in FIG. 3, hereinafter, "step" is omitted).

Then, the user tries to aggregate the nine icons 31 to 39 into one icon. To aggregate the icons, firstly, the user touches the icon 31, which is located at the leftmost top on the display screen 13, with a finger 41, and slides the finger 41 over the other icons 32, 33, 34, 35, 36, 37, 38 continuously as if the finger 41 is connecting the icons. The sliding gesture with the finger 41 as if to connect the icons 31 to 39 is similar to a swipe operation.

Figure 4:
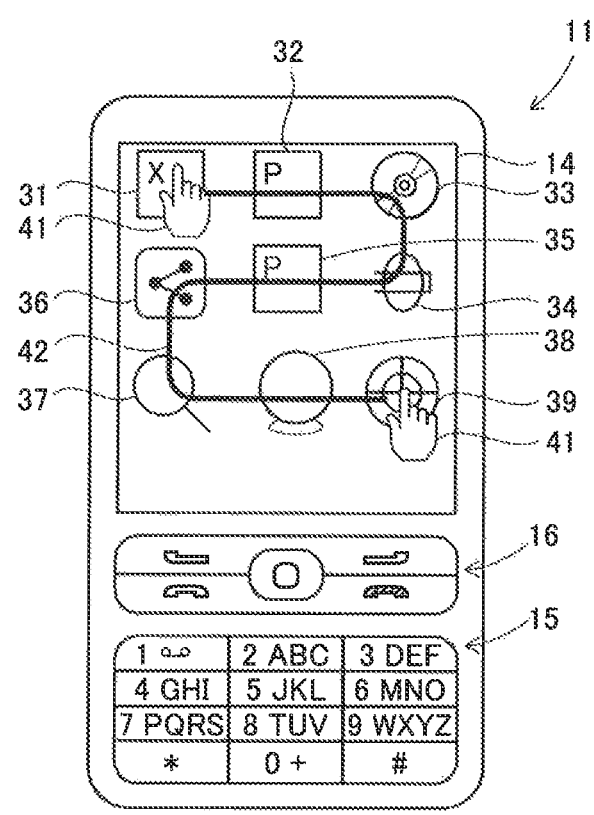
FIG. 4 illustrates a plurality of icons that are touched as if they were connected.

FIG. 4 shows the icons 31 to 39 that the user touches as if to connect them. Referring to FIG. 4 in addition to the other drawings, the user firstly touches the upper left icon 31 as a starting point, slides the finger 41 rightward from the upper left icon 31 to the icon 32 and icon 33, and then moves the finger 41 down to the icon 34. Continuously, the user slides the finger 41 leftward from the icon 34 to the icon 35 and icon 36. After the finger 41 reaches the icon 36, the user moves the finger 41 down to the icon 37. Subsequently, the user moves the finger 41 rightward from the icon 37 to the icon 38 and icon 39. At last, the user releases the finger 41 off the icon 39 that is the last icon to be aggregated. In FIG. 4, the path through which the finger 41 touches and slides over the icons 31 to 39 is indicated with a line 42.

The selection detecting unit 23 detects that the nine icons 31 to 39 displayed on the display screen 13 have been selected as if the icons were connected along a line (YES in S12). Upon the selection of the nine icons 31 to 39 as if they were connected along a line is detected by the selection detecting unit 23, the icon identifying unit 24 identifies the touched icons 31 to 39 along the line.

Specifically, the icon identifying unit 24 identifies the firstly-touched icon 31 (S13). Then, the touched icons 32 to 38 located along the line are identified (S14). Subsequently, the icon identifying unit 24 identifies the position where the touch was released from the display screen 13 (S15). In this example, the position where the touch was released from the display screen 13 corresponds with the position where the icon 39 was disposed.

The aggregate-icon creating unit 25 creates an aggregate icon aggregating the touched nine icons 31 to 39 that were identified by the icon identifying unit 24 (S16). When three or more icons, in this example the icons 31 to 39, are aggregated, the aggregate-icon creating unit 25 creates an aggregate icon by combining the firstly-touched icon 31 with an icon that is a folder representing the icons 32 to 39, but not the icon 31 firstly touched by tapping, such that the icon 31 overlaps with the folder icon.

Figure 5:
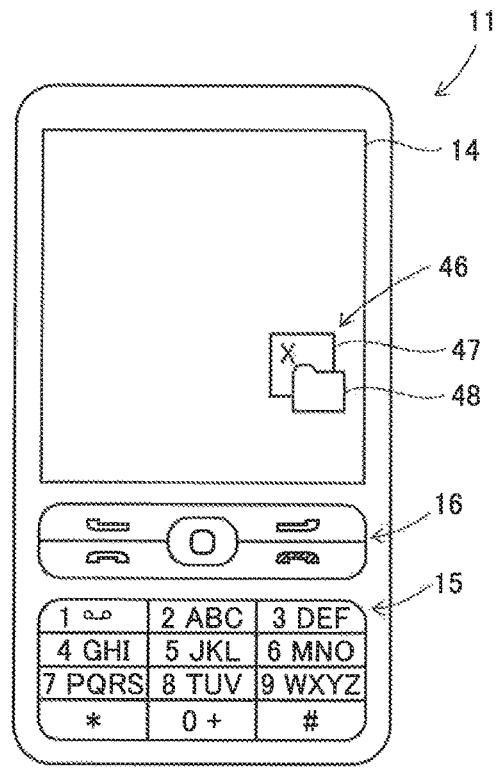
FIG. 5 illustrates an example of an aggregate icon displayed on a display screen.

FIG. 5 illustrates an example of the aggregate icon 46 displayed on the display screen 13. Referring to FIG. 5, a newly created aggregate icon 46 is displayed at the lower right of the display screen 13, more specifically, at the position where the icon 39 was disposed.

The aggregate icon 46 created by the aggregate-icon creating unit 25 is configured as follows. Referring to FIG. 5, the aggregate icon 46 includes mainly two icons 47 and 48 combined. The icon 47 is in the form of the firstly-touched icon 31 reduced in size somewhat. The icon 48 is in the form of a folder reduced in size. The folder-shaped icon 48 indicates that it is a folder, and suggests that the icon 48 contains the icons 32 to 39 therein. The aggregate-icon creating unit 25 arranges the icon 47 at the upper left and the icon 48 at the lower right so as to create the aggregate icon 46 with the icon 48 partially overlaid on the icon 47.

The display control unit 22 performs control operations to display the aggregate icon 46 created by the aggregate-icon creating unit 25 on the display screen 13 (S17). As shown in FIG. 5, the aggregate icon 46 is displayed at the position where the touch was released.

The aggregate icon 46 is configured to either launch the application of the file associated with the icon 47 or to open the folder associated with the icon 48 according to the duration of the time of the tap or the number of taps. Specifically, for example, a short tap may launch the application of the file associated with the icon 47, while a long tap may open the folder associated with the icon 48. Alternatively, a single tap may launch the application of the file associated with the icon 47, while two taps, or a double-tap, may open the folder associated with the icon 48.

Figure 6:
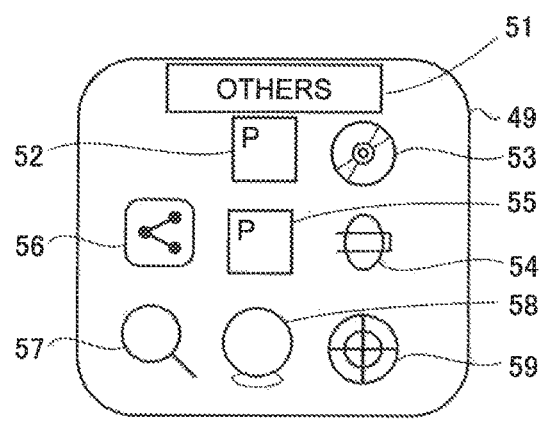
FIG. 6 illustrates an open folder associated with an icon.

FIG. 6 illustrates the folder associated with the icon 48 that is in an open state. Referring to FIG. 6, the folder 49 associated with the icon 48 has a message 51 indicating "others" at an upper part thereof, and contains eight icons 52, 53, 54, 55, 56, 57, 58, 59. The icons 52, 53, 54, 55, 56, 57, 58, 59 respectively correspond to the icons 32, 33, 34, 35, 36, 37, 38, 39 in FIG. 2. Tapping the icons 52 to 59 launches the applications of the files or opens the folders associated with the icons 52 to 59 just as in the case when the icons 32 to 39 in FIG. 2 are tapped.

The above-described display control device 21 is configured to, when detecting that the icons 31 to 39 have been selected as if the icons were connected along a line in order to aggregate the icons 31 to 39 into an icon, identify the selected icons 31 to 39 located along the line, create an aggregate icon 46, and display the aggregate icon 46. This configuration eliminates the need to manipulate the icons 31 to 39 one by one to aggregate the large number of icons 31 to 39. Thus, the display control device 21 can improve the convenience of users.

In this example, the display control unit 22 performs control operations to display the aggregate icon 46, which is created by the aggregate-icon creating unit 25, at the position of the icon from which the touch was released on the display screen 13. This configuration allows the user to clearly recognize the position where the aggregate icon 46 shows up.

When aggregating three or more icons, or aggregating the icons 31 to 39 in the above-described embodiment, the aggregate-icon creating unit 25 creates an aggregate icon 46 so as to overlap the firstly-selected icon 31 with the icon 48 that is a folder representing the icons 32 to 39 but not the firstly-selected icon 31; however, the embodiment is not limited thereto, and the aggregate-icon creating unit 25 can create an aggregate icon so as to overlap an icon that is selected twice with an icon that is a folder representing the other icons but not the twice-selected icon. This configuration allows the user to readily distinguish the icon that was selected twice in the aggregate icon.

The above-described aggregate-icon creating unit 25 can be controlled so as to start creating an aggregate icon after a press on either one of the icons 31 to 39 is detected for a predetermined period of time. Specifically, after a press on one of the icons 31 and 39 is detected for a predetermined period of time, the aggregate-icon creating unit 25 is activated. This configuration can create a more satisfying aggregate icon 46 of the user's intent.

Creation of an aggregate icon by the aggregate-icon creating unit 25 can be configured to start after a press on a given start key is detected, and to finish after a press on a given end key is detected. Specifically, the aggregate-icon creating unit 25 can be configured to start creating an aggregate icon 46 after detecting a press on a given start key, and finish creating the aggregate icon 46 after detecting a press of a given end key.

The icon identifying unit 24 identifies the icons 31 to 39 over which a user's finger moves as if to connect them. If another display screen that is different from the present display screen 13 displaying the icons 31 to 39 appears, the icon identifying unit 24 may continuously identify icons displayed on the different display screen. In short, the icon identifying unit 24 is configured to be able to continuously identify icons displayed on a different display screen appearing subsequent to the icons 31 to 39 on the present display screen 13. The user can display the different display screen, that is, change to the different display screen by, for example, flicking the display screen with another finger. This configuration can create a more satisfying aggregate icon to the user's request. To continuously identify icons displayed on a display screen subsequent to the icons 31 to 39 on the present display screen 13, the icon identifying unit 24 can be configured to firstly detect a press on a selection continuing button before the display screen is changed, and identify the icons. Detecting a press on the provided selection continuing button allows the icon identifying unit 24 to reliably receive an instruction to continuously identify icons.

The icon identifying unit 24 in the above embodiment is configured to identify the icons 31 to 39 that have been selected with the user's finger without lifting the finger from the display screen in order to aggregate the icons; however, the embodiment is not limited thereto, and the icon identifying unit 24 can be configured to identify the icons 31 to 39 that have been selected through a predetermined identifying gesture or an additionally provided continuation key (not shown). In short, the icon identifying unit 24 can be configured to identify the icons 31 to 39 to be aggregated in response to at least one of a predetermined identifying gesture and a press on a continuation key. This configuration can further improve user convenience. The predetermined identifying gesture includes, for example, a double-click and touching two positions.

The aggregate icon 46 can be configured to be identified by the icon identifying unit 24 for further aggregation. The aggregate icon 46 can be configured to unfold the aggregated icons 31 to 39 on the display screen 13 in response to a predetermined unfolding gesture, such as a long press, and the unfolded icons 31 to 39 are selectable. Thus, the display control device can be configured to include an aggregate-icon unfolding unit that takes out the icons from an aggregate icon when detecting a predetermined unfolding gesture performed on the aggregate icon. The predetermined unfolding gesture includes, for example, pressing the aggregate icon 46 for a predetermined period of time or longer.

In the above-described embodiment, the display control unit 22 performs control operations to display the aggregate icon 46, which is created by the aggregate-icon creating unit 25, at the position of the icon from which a touch was released on the display screen 13; however, the embodiment is not limited thereto, and the display control unit 22 can perform control operations so as to display the aggregate icon 46, which is created by the aggregate-icon creating unit 25, at any position from which a touch was released on the display screen 13.

Figure 7:
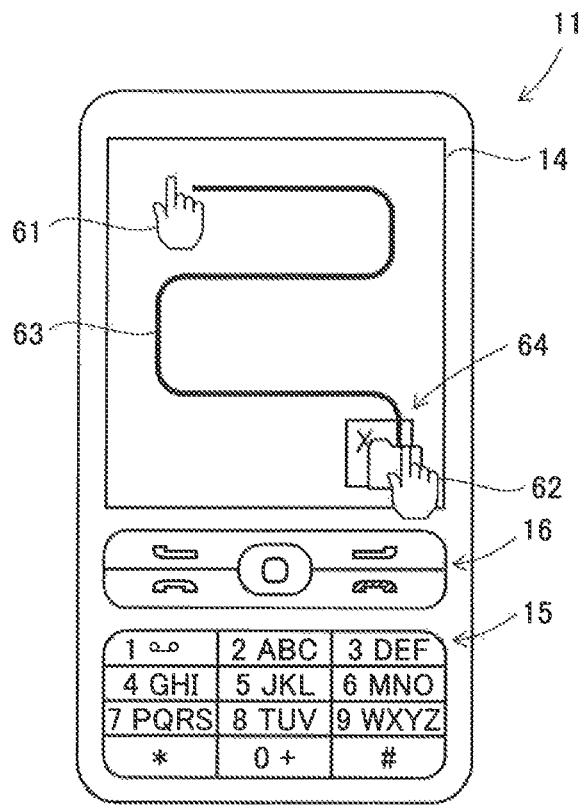
FIG. 7 illustrates an example of the display screen when an aggregate icon, which is created by an aggregate-icon creating unit, shows up at the position where a touch was released from the display screen.

FIG. 7 illustrates an example of the display screen 13 when the aggregate icon 46 created by the aggregate-icon creating unit 25 is displayed at a position from which a touch was released on the display screen 13. Referring to FIG. 7, a finger 61 touches icons (not shown) and slides over the icons as if to connect the icons along a path indicated by a line 63. The position at which the finger 62 is lifted is the position where no icon was displayed on the display screen 13. The display control unit 22 aggregates the icons along the line 63 in a created aggregate icon 64, and displays the aggregate icon 64 at the position. The aggregate icon can be configured to show up as described above.

When aggregating two icons, the aggregate-icon creating unit 25 reduces the size of the firstly-touched icon and the secondly-touched icon and combines them so as to create an aggregate icon with the two icons overlapping each other.

The aggregate icon created by the aggregate-icon creating unit 25 can be configured to separate into two icons through a predetermined separating operation performed on the aggregate icon. The predetermined separating operation includes, for example, a pinch-out gesture.

Figure 8:
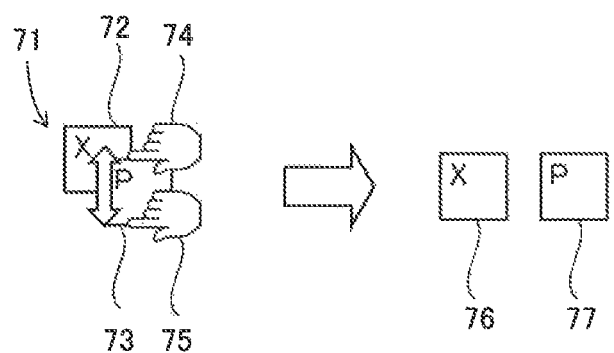
FIG. 8 illustrates a process in which a created aggregate icon is separated into two icons by a pinch-out gesture.

FIG. 8 illustrates how to separate an aggregate icon into two icons with a pinch-out gesture. Referring to FIG. 8, an aggregate icon 71 shown on the left side in the drawing is created by the aggregate-icon creating unit 25 combining two icons 72 and 73. If the aggregate icon 71 is pinched out with fingers 74, 75 as shown in FIG. 8, the aggregate icon 71 is separated into two icons 76 and 77 as shown on the right side in the drawing. Thus, the aggregated icons 76 are 77 are brought back to their original states. This configuration can readily aggregate icons and disaggregate the aggregate icon according to the user's needs. The predetermined separating operation is of course not limited to the aforementioned pinch-out gesture.

The aggregate icon can be disaggregated also in the following manner. The aggregate icon created by the aggregate-icon creating unit 25 can be configured to be disaggregated through a predetermined disaggregate operation. The predetermined disaggregate operation includes, for example, a flick gesture. When a user taps an aggregate icon and then flicks the aggregate icon in either one direction, the aggregation of the icons of files associated with given applications are canceled, and the icons show up outside the aggregate icon. More specifically, if the user flicks the aggregate icon in an upper right direction, an icon of a file associated with a first application is released from the aggregate icon and is displayed independently, and if the user flicks the aggregate icon in a lower left direction, an icon of a file associated with a second application is released from the aggregate icon and is displayed independently. The aggregate icon can be configured as described above. The predetermined disaggregate operation is of course not limited to the aforementioned flick gesture.

The aggregate-icon creating unit 25 described in the above embodiment can be configured to perform aggregate operation on an already-aggregated aggregate icon. For example, the aggregate-icon creating unit 25 may create an aggregate icon with a folder containing a folder. Of course, the aggregate-icon creating unit 25 can be configured to prohibit creating a folder in a folder, or to issue a kind of warning or message before creating an aggregate icon.

The aggregate-icon creating unit 25 in the above-described embodiment is configured to use the firstly-touched icon as a part of the aggregate icon; however, the embodiment is not limited thereto, and the aggregate-icon creating unit 25 can be configured to show candidate icons to the user so that the user can select one of the candidate icons and use the selected icon as a part of the aggregate icon.

The aggregate icon created by the aggregate-icon creating unit 25 is not limited to the form of a combination of two icons, but can be simply in the form of a folder. Alternatively, the aggregate icon can be in the form of a combination of three or more reduced-scale icons.

The above embodiment describes the display control device 21 included in the mobile terminal apparatus 11; however, the embodiment is not limited thereto, and the display control device 21 can be used to control the display screen of other electronic devices, such as a tablet PC.

In addition, the above-described embodiment adopts the display screen 13 as a display unit; however, the embodiment is not limited thereto, and the display unit may be other units in addition to the display screen. Furthermore, the nonvolatile memory 14 adopted in the embodiment may be, for example, a memory device or a hard disk.

It should be understood that the embodiment disclosed herein is illustrative and non-restrictive in every respect. The scope of the present invention is defined by the terms of the claims, rather than by the foregoing description, and is intended to include any modifications within the scope and meaning equivalent to the terms of the claims.

INDUSTRIAL APPLICABILITY

The display control device according to the present invention can be effectively used especially to meet a demand for improving user convenience.

What is claimed is:

1. A display control device displaying icons on a display unit comprising:
a display control unit that performs control operations to display icons on the display unit;
a selection detecting unit that detects whether a plurality of the icons displayed on the display unit have been selected as if the icons were connected along a line;
an icon identifying unit that, when the selection detecting unit detects that the plurality of icons have been selected as if the icons were connected along a line, identifies the selected icons along the line;
an aggregate-icon creating unit that creates an aggregate icon aggregating the icons identified by the icon identifying unit; and
an aggregate-icon unfolding unit that takes out the icons aggregated in the aggregate icon when detecting a predetermined unfolding gesture performed on the aggregate icon, wherein
the display control unit performs control operations to display the aggregate icon created by the aggregate-icon creating unit on the display unit,
when three or more of the icons are aggregated, the aggregate-icon creating unit creates the aggregate icon by combining a first icon that is a firstly-selected icon with a folder icon that is a folder representing the icons except for the first icon so as to arrange the first icon reduced in size at the upper left and the folder icon at the lower right so the first icon partially overlaps the folder icon, and
the aggregate-icon unfolding unit unfolds to arrange the icons aggregated by the folder icon except for the first icon in an area of the folder icon.

2. The display control device according to claim 1, wherein
the display control unit performs control operations to display the aggregate icon created by the aggregate-icon creating unit at a position at which selection is ended on the display unit.

3. The display control device according to claim 1, wherein
the aggregate icon created by the aggregate-icon creating unit is separable into two icons through a predetermined separating operation performed on the aggregate icon.

4. The display control device according to claim 1, wherein
the aggregate icon created by the aggregate-icon creating unit is disaggregated through a predetermined disaggregate operation.

5. The display control device according to claim 1, wherein
the aggregate-icon creating unit is activated after a press on the icons is detected for a predetermined period of time.

6. The display control device according to claim 1, wherein
the aggregate-icon creating unit starts creating the aggregate icon after detecting a press on a given start key, and finishes creating the aggregate icon after detecting a press on a given end key.

7. The display control device according to claim 1, wherein
the icon identifying unit is able to continuously identify icons displayed on a different display unit subsequent to the icons presently displayed on the display unit.

8. The display control device according to claim 7, wherein
when the icons displayed on the different display unit are continuously identified subsequent to the icons presently displayed on the display unit, the icon identifying unit firstly detects a press on a selection continuing button before the display screen is changed, and identifies the icons.

9. The display control device according to claim 1, wherein
the icon identifying unit identifies the icons to be aggregated in response to at least one of a predetermined identifying gesture and a press on a continuation key.

10. The display control device according to claim 1, wherein
the icon identifying unit can identify the aggregate icon.

11. The display control device according to claim 1, wherein
the predetermined unfolding gesture includes pressing the aggregate icon for a predetermined period of time or longer.

12. A display control device displaying icons on a display unit comprising:
a display control unit that performs control operations to display icons on the display unit;
a selection detecting unit that detects whether a plurality of the icons displayed on the display unit have been selected as if the icons were connected along a line;
an icon identifying unit that, when the selection detecting unit detects that the plurality of icons have been selected as if the icons were connected along a line, identifies the selected icons along the line;
an aggregate-icon creating unit that creates an aggregate icon aggregating the icons identified by the icon identifying unit; and
an aggregate-icon unfolding unit that takes out the icons aggregated in the aggregate icon when detecting a predetermined unfolding gesture performed on the aggregate icon, wherein
the display control unit performs control operations to display the aggregate icon created by the aggregate-icon creating unit on the display unit,
when three or more of the icons are aggregated, the aggregate-icon creating unit creates the aggregate icon by combining a twice-selected icon with a folder icon that is a folder representing the icons except for the twice-selected icon so as to arrange the second icon reduced in size at the upper left and the folder icon at the lower right so the second icon partially overlaps the folder icon, and
the aggregate-icon unfolding unit unfolds to arrange the icons aggregated by the folder icon except for the first icon in an area of the folder icon.

* * * * *